No. 771,139. PATENTED SEPT. 27, 1904.
C. B. FUDGE.
NUT LOCK.
APPLICATION FILED FEB. 8, 1904.
NO MODEL.
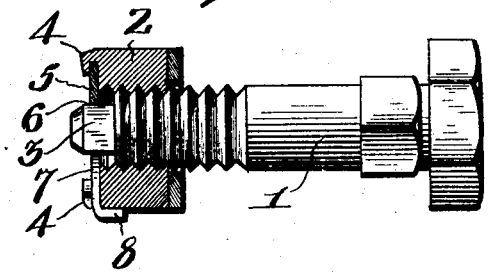
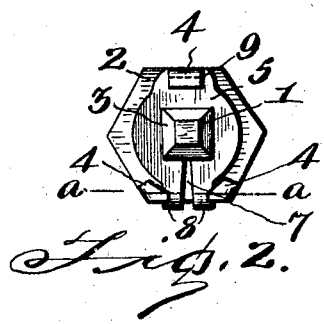
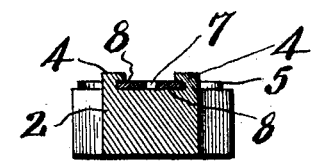
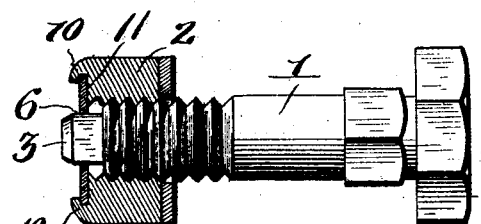
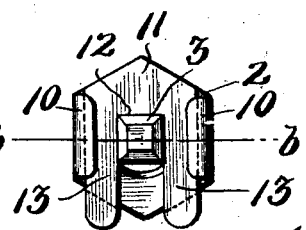
Inventor
Charles B. Fudge,
Witnesses
By
Attorney No. 771,139. Patented September 27, 1904.

UNITED STATES PATENT OFFICE.

CHARLES B. FUDGE, OF MUNCIE, INDIANA, ASSIGNOR OF ONE-HALF TO JOHN MILTON FUDGE, OF MUNCIE, INDIANA.

NUT-LOCK.

SPECIFICATION forming part of Letters Patent No. 771,139, dated September 27, 1904.

Application filed February 8, 1904. Serial No. 192,608. (No model.)

*To all whom it may concern:*

Be it known that I, CHARLES BROUGH FUDGE, a citizen of the United States, residing at Muncie, in the county of Delaware and State of Indiana, have invented certain new and useful Improvements in Nut-Locks; and I do declare the following to be a full, clear, and exact description of the invention, such as will enable others skilled in the art to which it appertains to make and use the same.

My invention is an improved nut-lock; and it consists in the construction, combination, and arrangement of devices hereinafter described and claimed.

In the accompanying drawings, Figure 1 is partly a longitudinal sectional view and partly an elevation of a nut, bolt, and locking-plate providing a nut-lock embodying my improvements. Fig. 2 is an end elevation of the same. Fig. 3 is a transverse section taken on the plane indicated by the line *a a* of Fig. 2. Fig. 4 is an end elevation of a modified form of nut-lock embodying my invention; and Fig. 5 is a transverse sectional view of the same, taken on the plane indicated by the line *b b* of Fig. 4.

The bolt 1, on which the nut 2 is secured, has its threaded stem provided with an angular portion 3, which is here shown as at its outer end. The nut, which engages the screw-threaded portion of the bolt-stem in the usual manner, is provided on its outer side with flange-lugs 4. Three of these lugs are shown in Fig. 2, one of them at one side of the nut and the others at the opposite side thereof and appropriately spaced apart.

In connection with the bolt and the nut there is a lock-plate 5, which is made of spring-steel, has an angular opening 5 of size and shape to adapt it to receive the angular portion 3 of the bolt-stem, and the said lock-plate is split at one end, as as 7, and provided with arms 8, which by the spring energy of the lock-plate are moved apart laterally and engage normally with the pair of lugs at one side of the nut, as shown in Fig. 3. The integral end of the lock-plate is here shown as notched, as at 9, and engaged with the flange-lug at the opposite side of the nut. The ends of the arms 8 project beyond one side of the nut and may be turned at right angles, as here shown. These projecting ends of the arms may be engaged by means of a pair of pincers and compressed so as to move the arms 8 toward each other, and thereby release them from the coacting pair of flange-lugs, and thus enable the lock-plate to be detached from the nut, as will be understood.

In the form of my invention shown in Figs. 4 and 5 the nut is provided with a pair of oppositely-disposed flange-lugs 10, and the lock-plate 11 has an angular opening 12 therein formed between a pair of parallel arms 13, the outer sides of which are flush with those of the plate, the plate being longitudinally movable aross the face of the nut to engage it with the flange-lugs and the angular portion of the bolt-stem and to enable it to be moved in the opposite direction to disengage it from the flange-lugs and the bolt-stem. The length of the arms is such that their outer ends may be bent at right angles when the nut is locked on the bolt-stem by the lock-plate, so that the said bent ends bear against one side of the nut to prevent the lock-plate from becoming casually detached therefrom.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. The combination of a bolt having its threaded stem provided with a cross-sectionally angular projection, a nut engaging the threaded stem and having on its outer side flange-lugs, which are recessed in their opposing sides, and a lock-plate having an angular opening to receive the angular projection of the stem, having one end engaged with the notch of one of the flange-lugs of the nut, and having a pair of spring-arms, movable toward and from each other, said spring-arms extending between and engaging notches in a pair of the flange-lugs, substantially as described.

2. The combination of a bolt having its threaded stem provided with an angular portion, a nut engaging the threaded stem and having flange-lugs on its outer side, and a spring lock-plate on the nut having an angular opening through which the angular portion of the bolt extends, said lock-plate being further provided at one end with laterally-spaced arms extending from the opening, engaging the flange-lugs and detachable therefrom to release the bolt by laterally pressing the said arms toward each other.

3. The combination of a bolt having its threaded stem provided with an angular portion, a nut engaging the threaded stem and having flange-lugs on its outer side and a spring lock-plate on the nut having an angular opening through which the angular portion of the bolt extends, said plate being provided at one end with laterally-spaced arms extending from the opening and engaging certain of the flange-lugs and detachable therefrom by pressing the said arms toward each other, the other end of the lock-plate engaging the other lug of the nut, substantially as described.

In testimony whereof I have hereunto set my hand in presence of two subscribing witnesses.

CHAS. B. FUDGE.

Witnesses:
  BENJ. G. COWL,
  L. O. HILTON.